US007415127B2

(12) United States Patent
Bodo et al.

(10) Patent No.: US 7,415,127 B2
(45) Date of Patent: Aug. 19, 2008

(54) SYSTEM AND METHOD OF WATERMARKING A VIDEO SIGNAL AND EXTRACTING THE WATERMARKING FROM A VIDEO SIGNAL

(75) Inventors: Yann Bodo, Rennes (FR); Nathalie Laurent, Vignoc (FR)

(73) Assignee: France Telecom, Paris (FR)

( * ) Notice: Subject to any disclaimer, the term of this patent is extended or adjusted under 35 U.S.C. 154(b) by 505 days.

(21) Appl. No.: 10/697,106

(22) Filed: Oct. 31, 2003

(65) Prior Publication Data
US 2004/0175017 A1 Sep. 9, 2004

(30) Foreign Application Priority Data
Oct. 31, 2002 (FR) .................................. 02 13660

(51) Int. Cl.
*G06K 9/00* (2006.01)
*G06K 9/36* (2006.01)
*G06K 9/46* (2006.01)

(52) U.S. Cl. ..................... 382/100; 382/232; 382/107

(58) Field of Classification Search ................ 382/100, 382/232, 107
See application file for complete search history.

(56) References Cited

U.S. PATENT DOCUMENTS 5,960,081 A * 9/1999 Vynne et al. ................. 713/176
6,785,332 B1 * 8/2004 Kutter et al. ............ 375/240.16
6,845,130 B1 * 1/2005 Han et al. ............... 375/240.16
2002/0114488 A1 * 8/2002 Suda ......................... 382/100
2002/0136304 A1 * 9/2002 Akhan et al. ........... 375/240.16

FOREIGN PATENT DOCUMENTS

JP 2000165889 A * 6/2000

OTHER PUBLICATIONS

Dugelay, J.—"Watermarking video, hierarchical embedding in motion vectors"—IEEE—Sep. 2003, pp. 739-742.*
Zhang et al., "Embedding Watermark in MPEG Video Sequence," XP010565828, pp. 535-540, Oct. 3, 2001.

* cited by examiner

*Primary Examiner*—Jingge Wu
*Assistant Examiner*—Bernard Krasnic
(74) *Attorney, Agent, or Firm*—Oliff & Berridge, PLC

(57) ABSTRACT

This method comprises the following steps of applying a watermarking function to motion vectors calculated by estimation of movement between images of a video signal, followed by a step of generating the watermarked video signal by compensating movement with the aid of the watermarked motion vectors. The watermarking function is applied by marking the coordinates of the selected motion vector in a reference space, certain portions of this space constituting a first zone and the other portions of this space constituting a second zone complementary to the first, assigning a binary value to each of the two zones, and, if necessary, modifying the coordinates of the selected motion vector so that it is in the zone whose binary value corresponds to a bit of a marking key associated with the selected motion vector.

18 Claims, 3 Drawing Sheets

SYSTEM AND METHOD OF WATERMARKING A VIDEO SIGNAL AND EXTRACTING THE WATERMARKING FROM A VIDEO SIGNAL

FIELD OF THE INVENTION

The present invention relates to a method of watermarking a video signal, a corresponding system, and a computer readable data medium for storing a signal watermarked by this method. It also relates to a method of extracting the watermarking from a video signal and a system for implementing this method.

To be more precise, the invention relates to a method of watermarking a video signal by applying a watermarking function to motion vectors calculated by motion estimation between images of the video signal, the method being of the type comprising the following steps:

applying the watermarking function to at least some of the calculated motion vectors; and
generating the watermarked video signal by motion compensation with the aid of the watermarked motion vectors, the watermarking function being applied with the aid of a binary marking key, each bit of which is associated with at least one selected motion vector.

BACKGROUND OF THE INVENTION

A method of the above kind is described in the paper by F. Jordan, M. Kutter, and T. Ebrahimi, "Proposal of a watermarking technique for hiding/retrieving data in compressed and decompressed video", ISO/IEC document JTC1/SC29/WG11/MPEG97/M2281, of July 1997. In that document, the watermarking function is applied with the aid of a marking key. This is a binary word of 16 or 32 bits inserted into the motion vectors of the video signal, which motion vectors are obtained with the aid of an MPEG4 encoder. The number of motion vectors selected is the same as the number of bits in the marking key, i.e. 16 or 32 motion vectors are selected. Then, for each of the vectors selected, the corresponding bit of the marking key is inserted into one of the components of the motion vector, for example the vertical component, modifying its parity.

Unfortunately, that solution is not very robust, since the slightest attack can transform an even ordinate into an odd ordinate and vice-versa. Here, the term "attack" means malicious attacks and also non-malicious attacks such as compression or changing the spatial or the temporal format of the video signal. Moreover, by always modifying the same predetermined component of the selected motion vectors, for example the vertical component, that solution runs the risk of making the watermarking more visible in the video signal.

SUMMARY OF THE INVENTION

The invention aims to remedy those drawbacks by providing a robust method of watermarking a video signal that improves watermarking performance in terms of invisibility and in which the watermarking is carried by the motion vectors.

To this end, the invention consists in a method of the above-specified type for watermarking a video signal, wherein, in order to apply the watermarking function, the method further comprises the following steps:

marking the coordinates of the selected motion vector in a space including a reference partition, certain portions of this space constituting a first zone and the other portions of this space constituting a second zone, complementary to the first;
assigning a binary value to each of the two zones; and
where necessary, modifying the coordinates of the selected motion vector so that it is in the zone whose binary value corresponds to the bit of the marking key with which the selected motion vector is associated.

With this approach, greater diversity in the modification of the selected motion vectors can be envisaged, which improves the quality of the watermarking in terms of invisibility. Robustness is also improved since the watermarking leads to modifying the components of the selected motion vectors by a geometrical transformation and not solely by a change of parity.

A method of the invention may further comprise the feature whereby the reference partition is a reference grid comprising blocks with predefined dimensions, each block comprising a first zone and a second zone.

A watermarking method of the invention optionally includes the following steps:

calculating a hierarchical plurality of successive levels of motion vectors, the motion vectors of a given level each being associated with a plurality of motion vectors of the next lower level;
selecting at least some of the motion vectors belonging to the highest level;
applying the watermarking function to each selected motion vector, leading to calculating a modification parameter for said motion vector; and
applying the modification parameter of the selected motion vector to the motion vectors of a lower level associated with said motion vector.

The hierarchical approach of this method effectively increases the robustness of watermarking by judiciously spreading the marking key over a plurality of motion vectors, starting from a single selected motion vector.

A method of the invention for watermarking a video signal may further comprise one or more of the following features:

the motion vectors of a given level are each equal to the average of the motion vectors of the next lower level with which they are associated;
it includes a step of calculating a hierarchy of two successive levels of motion vectors, each motion vector of the higher level being associated with four motion vectors of the lower level;
the first and second zones have substantially equal areas;
a sub-block centered inside the block is defined in each block of the reference grid, the first zone being defined by the interior of the sub-block and the second zone being the zone in the block complementary to the first zone;
the blocks and sub-blocks of the reference grid are rectangular;
the modification, if any, applied to the selected motion vector is a weighted symmetry;
the modification, if any, applied to the selected motion vector is either a weighted central symmetry relative to one of the vertices of the sub-block or a weighted axial symmetry relative to one of the sides of the sub-block;
each bit of the binary marking key is associated with a plurality of selected motion vectors;
some of the bits of the binary marking key are associated with motion vectors calculated by motion estimation between two images of the video signal, and at least some of the other portion bits of the binary marking key are associated with motion vectors calculated by motion estimation between at least two other images of the video signal.

The invention also consists in a video signal watermarking device including means for implementing a method as described above.

The invention further consists in a computer readable data medium including means for storing a video signal watermarked with the aid of a method as described above.

The invention further consists in a method of extracting watermarking from a video signal watermarked by applying a method as described above, which extraction method comprises applying a function for extracting the binary marking key, and consisting in:

selecting the watermarked vectors;
marking the coordinates of each watermarked motion vector in the reference grid;
assigning the binary value of the zone in which the watermarked vector is situated to the bit of the marking key with which the selected motion vector is associated.

A method of extracting the watermarking from a video signal may further comprise, for each motion vector of the highest level selected on applying the watermarking method, the following steps:

extracting the watermarked motion vectors associated with said motion vector;
calculating an average vector equal to the average of the watermarked motion vectors associated with said motion vector; and
applying the marking key extraction function to the calculated average vector.

Finally, the invention further consists in a device for extracting the watermarking from a video signal, which device includes means for implementing a watermarking extraction method as described above.

BRIEF DESCRIPTION OF THE DRAWINGS

The invention will be better understood on reading the following description, which is given by way of example only and with reference to the accompanying drawings, in which.

DETAILED DESCRIPTION

Figure 1:
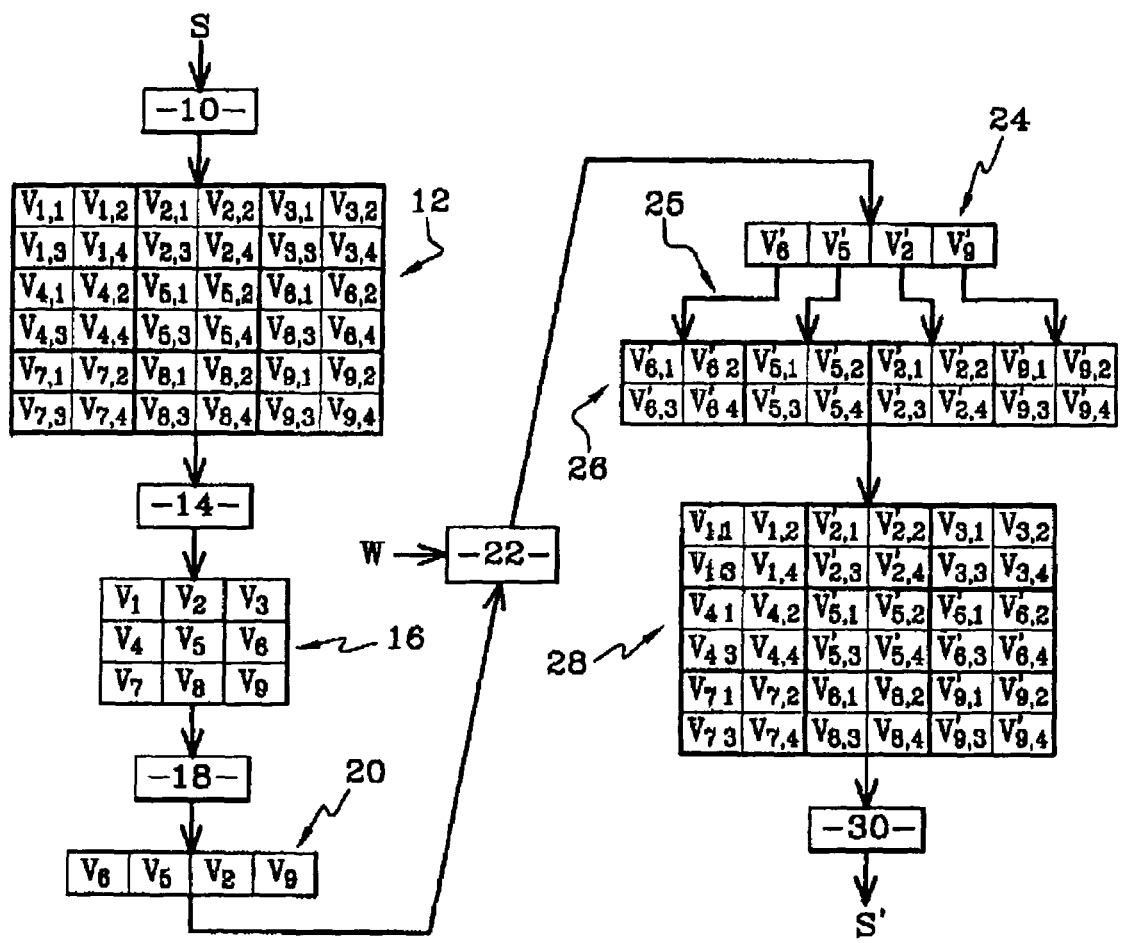
FIG. 1 shows the successive steps of a watermarking method of the invention.

The watermarking method shown in FIG. 1 is implemented by conventional data processing means, for example a microcomputer that comprises a central processor unit (CPU) associated with random access memory (RAM) and read-only memory (ROM).

The watermarking method includes a first step 10 of motion estimation.

During this step, a source video signal S is fed to the input of the microcomputer and a matrix 12 of motion vectors is associated with any image of the video signal S in the conventional way. This matrix of motion vectors is used to generate a prediction of the image concerned, for example starting with the preceding image of the video signal, by moving blocks of pixels thereof as a function of the calculated motion vectors.

The motion vectors are calculated by applying a block matching method, for example. For each block of pixels of the image concerned, this method consists in evaluating the best motion vector for reconstructing the current block from a block of the same size in the preceding image displaced with the aid of the motion vector. To this end, a search is conducted around the current block in the preceding image in order to determine the motion vector that minimizes a standard Displaced Frame Difference (DFD) cost function, representing the difference between the displaced preceding image and the current block in the image concerned.

The matrix 12 of motion vectors represented in this figure includes thirty-six motion vectors denoted $\vec{V}_{i,j}$, with $1 \leq i \leq 9$ and $1 \leq j \leq 4$. Of course, the number of motion vectors is generally greater. Only thirty-six are shown to simplify the remainder of the description.

Then, during a step 14, a higher level of motion vectors 16 is calculated. At this higher level, each motion vector is associated with four motion vectors of the lower level 12. In fact, the blocks corresponding to each motion vector of the lower level 12 are grouped four at a time into macroblocks. The higher level therefore includes nine vectors denoted $\vec{V}_1$ to $\vec{V}_9$.

Each motion vector $\vec{V}_i$ of the higher level is representative of a macroblock and is calculated in the following manner:

$$\vec{V}_i = \frac{1}{4} \sum_{j=1}^{4} \vec{V}_{i,j}$$

Step 14 could be iterated several times, which would create a hierarchy of motion vector levels. This example is limited to one iteration, that is to say to two levels of motion vectors.

Then, during a step 18, a set 20 of motion vectors is selected from the motion vector 16 of the higher level in a deterministic manner or in a pseudorandom manner on the basis of a secret key or on the basis of a mask. In this example, the set 20 of selected motion vectors comprises the vectors $\vec{V}_6$, $\vec{V}_5$, $\vec{V}_2$, and $\vec{V}_9$.

During the watermarking step 22 that follows, the selected vectors 20 are modified by applying a watermarking function to them with the aid of a marking key W. The number of motion vectors 20 selected is directly related to the size of the marking key W. In this example, W is a binary word comprising four bits, which is why four motion vectors were selected in step 18.

Accordingly, during step 22, the parameters of the watermarking function are set to insert the first bit of the marking key W into the motion vector $\vec{V}_6$, the second bit into the motion vector $\vec{V}_5$, the third bit into the motion vector $\vec{V}_2$, and the fourth bit into the motion vector $\vec{V}_9$.

The chosen watermarking function is described in more detail with reference to FIGS. 2 to 6. However, generally speaking, it can be modeled by the following equation:

$$f(\vec{V}_i) = \vec{V}_i + \delta \vec{V}_i$$

in which $\delta \vec{V}_i$ is a parameter depending on the chosen watermarking function and on the $i^{th}$ bit of the marking key W to be inserted.

After this step 22, four new motion vectors $\vec{V'}_6$, $\vec{V'}_5$, $\vec{V'}_2$ and $\vec{V'}_9$ 24 are obtained. As indicated above, these vectors satisfy the following equations:

$$\vec{V'_6} = \vec{V_6} + \vec{\delta V_6}$$

$$\vec{V'_5} = \vec{V_5} + \vec{\delta V_5}$$

$$\vec{V'_2} = \vec{V_2} + \vec{\delta V_2},$$

$$\vec{V'_9} = \vec{V_9} + \vec{\delta V_9},$$

During the next step 25, the watermarking function is applied to the motion vectors of the lower level that are associated with the selected vectors 20, using the parameters $\vec{\delta V_i}$ calculated during the preceding step. For example, the transformation $\vec{\delta V_6}$ applied to the motion vector $\vec{V_6}$ is also applied to the corresponding vectors of the lower level, i.e. to the vectors $\vec{V_{6,1}}$, $\vec{V_{6,2}}$, $\vec{V_{6,3}}$, $\vec{V_{6,4}}$. Thus sixteen new motion vectors 26 are obtained at the lower level, satisfying the following equation:

$$\forall i \in \{6;5;2;9\}, \forall j \in \{1,2,3,4,\} \vec{V'_{i,j}} = \vec{\delta V_i}$$

These sixteen new motion vectors replace the corresponding original vectors to furnish a new matrix 28 of motion vectors. The new matrix 28 is used to obtain a watermarked version S' of the video signal S.

In fact, during a last step 30, movement compensation is applied with the aid of this motion vector matrix 28, based on the image that was used as a reference for motion estimation during step 10, i.e. the image preceding the image concerned.

Two methods can be envisaged for this step.

A first method consists in compensating movement with the aid of all of the motion vectors of the matrix 28 to obtain a watermarked version of the image concerned.

A second method consists in compensating movement only for the blocks corresponding to the motion vectors modified by the watermarking operation, leaving the other blocks of the image concerned unchanged, in order to improve image quality.

The steps 10 to 30 described above can be iterated over several images of the video signal S. The redundancy obtained in this way increases the robustness of the watermarking.

Watermarking redundancy can also be obtained by associating each bit of the marking key W with a plurality of selected motion vectors of the higher level.

A watermarking method like that described above cannot be used in a encoding/decoding system. However, the modifications to be made to it so that it can be used in a encoding/decoding system, using motion analysis, will be evident to the person skilled in the art. In fact, video coding methods, such as methods using the MPEG2 standard or the MPEG4 standard, generate matrices of motion vectors to which the above-described method can be applied when encoding the video signal.

It will be noted that step 14 is optional. Without applying this step, the selected motion vectors are the lower level motion vectors, and the less extensive spreading of the watermarking in the image can be compensated by selecting a plurality of motion vectors for each bit of the marking key. However, this has the effect of limiting the performance of the watermarking in terms of invisibility. In fact, one benefit of the hierarchical approach is applying the same deformation to adjoining motion vectors at the lower level.

In one particular embodiment of the invention, the insertion of the marking key into the video signal S can be distributed over a plurality of pairs of images. In other words, in this case, only a portion of the marking key W is inserted into the selected motion vectors of a matrix of motion vectors calculated between two successive images, after which the remainder of the marking key is inserted over one or more matrices of motion vectors calculated between other pairs of successive images of the video signal S.

The watermarking function applied to the selected motion vectors 20 is described next with reference to FIGS. 2 to 6.

Figure 2:
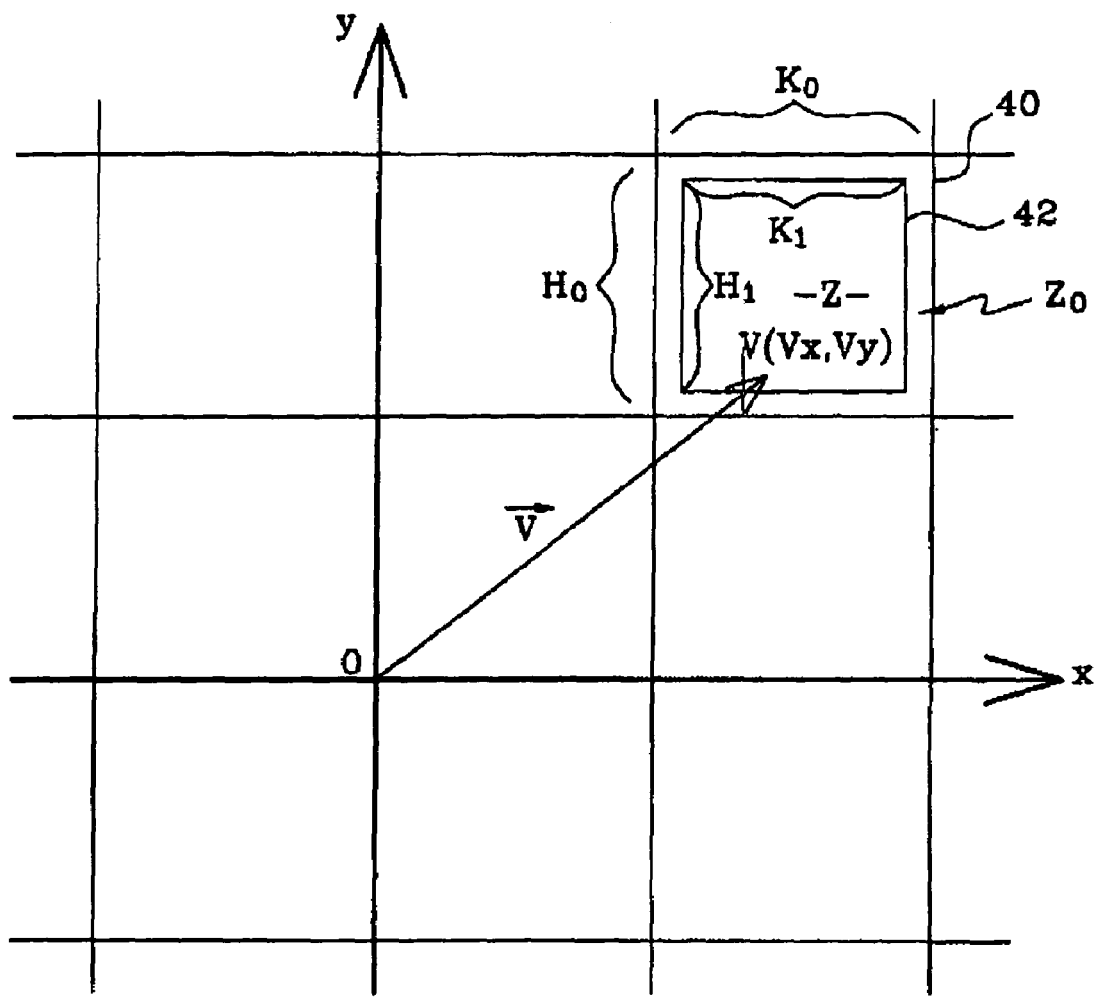
FIG. 2 is a reference grid used for applying a watermarking function of the invention.

Application of the watermarking function uses a reference grid that is shown in FIG. 2. This grid is placed in an orthogonal Cartesian system of axes (O, x, y) and is made up of blocks 40 with a dimension $K_0$ in the abscissa direction and a dimension $H_0$ in the ordinate direction. In this example, $K_0$ is equal to $H_0$ and has a value of seven pixels.

A centered sub-block 42 with smaller dimensions is defined inside each block. In this example, the sub-block 42 has the dimensions $K_1=H_1$=five pixels.

Two zones $Z_0$ and $Z_1$ are therefore defined within each block of the reference grid, the first zone $Z_0$ lying between the sub-block 42 and the block 40 and the zone $Z_1$ being the interior zone of the sub-block 42. The dimensions $K_0$, $H_0$, $K_1$ and $H_1$ are preferably chosen so that zones $Z_0$ and $Z_1$ have substantially the same area. In this example, the total area of each block 40 is 49 pixels, the area of zone $Z_1$ is 25 pixels and the area of zone $Z_0$ is 24 pixels.

Let $\vec{V}(V_x,V_y)$ be a motion vector selected for applying the watermarking function with the aid of the marking key W. To be more precise, applying the watermarking function to the vector $\vec{V}$ consists in transforming the latter so that it carries information for determining the value of one of the bits of the marking key, for example the $i^{th}$ bit $W_i$. The resulting vector is denoted $\vec{V'}(V'_x, V'_y)$.

Figure 5:
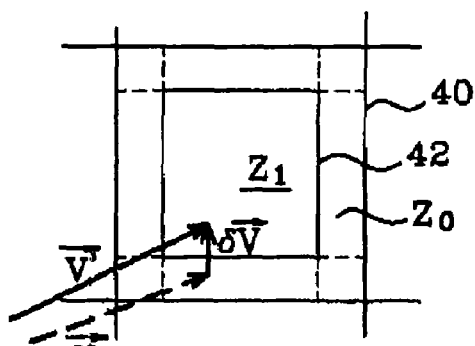
Figure 4:
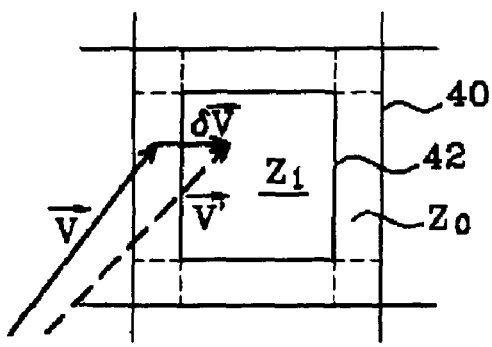

The watermarking function is defined by applying the following rules:

if $W_i$=0 and the point V with coordinates $(V_x, V_y)$ in (O, x, y) is in zone $Z_0$, then $\vec{V'}=\vec{V}$;

if $W_i$=0 and the point V with coordinates $(V_x, V_y)$ in (O, x, y) is in zone $Z_1$, then V is subjected to a transformation so that the point V' with coordinates $(V'_x, V'_y)$ in (O, x, y) is in zone $Z_0$ (this transformation is described in detail with reference to FIG. 3);

if $W_i$=1 and the point V with coordinates $(V_x, V_y)$ in (O, x, y) is in zone $Z_1$, then $\vec{V'}=\vec{V}$;

if $W_i$=1 and the point V with coordinates $(V_x, V_y)$ in (O, x, y) is in zone $Z_0$, then $\vec{V}$ is subjected to a transformation so that the point V' with coordinates $(V'_x, V'_y)$ in (O, x, y) is in zone $Z_1$ (this transformation is described in detail with reference to FIGS. 4, 5 and 6).

Figure 3:
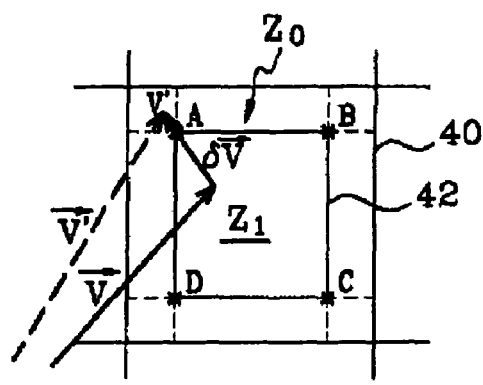
FIGS. 3, 4, 5, and 6 illustrate rules for applying the watermarking function.

FIG. 3 illustrates the situation in which $W_i$=0 and the point V is in zone $Z_1$, in other words inside the sub-block 42 whose vertices are denoted A, B, C and D.

The vertex closest to V is determined, here the point A, and then weighted central symmetry with respect to the center A is applied to displace the point V to V' in zone $Z_0$. Of course, the weighting parameter is calculated so that V' is always in zone $Z_0$. For example, given the dimensions of the blocks 40 and 42, the weighted central symmetry is defined here by the following equation:

$$\overrightarrow{AV'} = -\frac{2}{5}\overrightarrow{AV}.$$

If $W_i=1$ and V is in zone $Z_0$, then V' is obtained by applying weighted axial symmetry whose axis is the side of the sub-block 42 nearest the point V, if that transformation yields a point V' in zone $Z_1$. This is the situation shown in FIGS. 4 and 5.

In this case, if H denotes the projection of V onto the axis concerned, and with the dimensions chosen for this example, the weighted axial symmetry is defined by the following equation:

$$\overrightarrow{HV'} = -\frac{5}{2}\overrightarrow{HV}.$$

Figure 6:
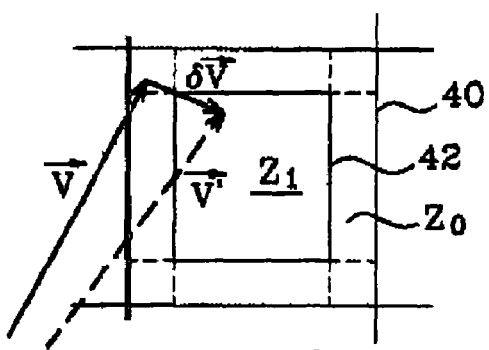

In the other situations represented in FIG. 6, that is to say if the image of the point V obtained by axial symmetry as described above does not yield any point V' in zone $Z_1$, a weighted central symmetry is applied to the point V whose center is the nearest vertex A, B, C, or D. In the FIG. 6 example, this is the point A. Here the equation $$\overrightarrow{AV'} = -\frac{5}{2}\overrightarrow{AV}$$

defines the weighted central symmetry. This situation arises when the point V is in the vicinity of one vertex of the block 40.

It is possible to detect and extract the mark inserted into a video signal using the watermarking method described above.

The mark detection and extraction method comprises applying a function for extracting the binary marking key W, and consisting in:
  selecting the watermarked vectors;
  marking the coordinates of each watermarked motion vector in the reference grid; and
  assigning the binary value of the zone in which the watermarked vector is situated to the bit of the marking key with which the selected motion vector is associated.

To be more precise, if step 14 has been executed during the watermarking of the video signal, for each motion vector 20 of the highest level 16 selected during applying the watermarking method:
  the watermarked motion vectors associated with that motion vector are extracted;
  an average vector is calculated equal to the average of the watermarked motion vectors 26 associated with that motion vector; and
  the function for extracting the marking key described above is applied to the calculated average vector.

This extraction method can extract an estimate $\tilde{W}=(\tilde{W}_1, \tilde{W}_2, \tilde{W}_3, \tilde{W}_4)$ of the marking key $W=(W_1, W_2, W_3, W_4)$ from a watermarked image of the video signal.

Once the marking key has been extracted, a correlation score is used to determine a+
  confidence threshold characterizing the presence or the absence of the marking key in the video signal.

A first correlation rule for estimating whether the marking key is present or not in an image is given by the following formula:

$$C = \frac{\sum_{i=1}^{4}\left[(\tilde{W}_i - \overline{\tilde{W}}) * (W_i - \overline{W})\right]}{\sqrt{\sum_{i=1}^{4}\left[(\tilde{W}_i - \overline{\tilde{W}})^2\right] * \sum_{i=1}^{4}\left[(W_i - \overline{W})^2\right]}}$$

in which:

$$\overline{\tilde{W}} = \frac{1}{4}\sum_{i=1}^{4}\tilde{W}_i \text{ and } \overline{W} = \frac{1}{4}\sum_{i=1}^{4}W_i.$$

A second correlation rule for estimating the presence of the marking key in a plurality of images $I'_n$ of the signal S' is given by the following recurrent formula:

$$C_n = \frac{C_{n-1} * (n-1) + \left(1 - \frac{d(\tilde{w}_n, w)}{8}\right)}{n}$$

in which $d(\tilde{w}_n, w)$ is the Hamming distance.

It is clear that a watermarking method of the invention improves the robustness and the performance in terms of invisibility of the existing methods.

In fact, the watermarking function, which aims to place a motion vector in a zone $Z_1$ or $Z_0$ as a function of the value of the bit of the marking key to be inserted, effects watermarking of the video signal that is hardly visible.

Another advantage of a watermarking method of the invention lies in the hierarchical approach described above with respect to step 14 in particular of the above-described method. Spreading the watermarking over a plurality of motion vectors of a lower hierarchical level based on the selection of a corresponding motion vector from a higher hierarchical level reduces the effect of an attack on the watermarking of the video signal, whether malicious or not.

What is claimed is:
1. A method of watermarking a video signal by applying a watermarking function to motion vectors calculated by estimation of movement between images of the video signal, the method comprising the following steps:
  applying the watermarking function to at least some of the calculated motion vectors; and
  generating the watermarked video signal by compensating movement with the aid of the watermarked motion vectors,
  the watermarking function being applied with the aid of a binary marking key, each bit of which is associated with at least one selected motion vector, wherein, in order to apply the watermarking function, the method further comprises the following steps:
  marking a point (V) corresponding to the coordinates (Vx, Vy) of the selected motion vector ($\overrightarrow{V}$), the marking taking place in a reference space (O, x, y) divided into a plurality of predetermined portions;
  defining two complementary zones $Z_0$ and $Z_1$ in each portion, one of the two zones being situated inside the other one;
  assigning a binary value to each of the two zones; and if the point corresponding to the coordinates of the selected motion vector is in the zone of the portion to which it belongs, of binary value which corresponds to the bit of the marking key with which the selected motion vector is associated, not modifying the coordinates of the selected motion vector;

if the point corresponding to the coordinates of the selected motion vector is not in the zone of the portion to which it belongs, of binary value which corresponds to the bit of the marking key with which the selected motion vector is associated, modifying the coordinates of the selected motion vector so that the point is in the zone, of binary value which corresponds to the bit of the marking key with which the selected motion vector is associated.

2. The method according to claim 1 for watermarking a video signal, wherein the reference space is a reference grid including blocks with predefined dimensions, each block including first and second zones.

3. The method according to claim 1 for watermarking a video signal, the method including the following steps:

calculating a hierarchical plurality of successive levels of motion vectors, the motion vectors of a given level each being associated with a plurality of motion vectors of the next lower level;

selecting at least some of the motion vectors belonging to the highest level;

applying the watermarking function to each selected motion vector, leading to calculating a modification parameter for said motion vector; and applying the modification parameter of the selected motion vector to the motion vectors of a lower level associated with said motion vector.

4. The method according to claim 3 for watermarking a video signal, wherein the motion vectors of a given level are each equal to the average of the motion vectors of the next lower level with which they are associated.

5. The method according to claim 3 for watermarking a video signal, the method including a step of calculating a hierarchy of two successive levels of motion vectors, each motion vector of the higher level being associated with four motion vectors of the lower level.

6. The method according to claim 1 for watermarking a video signal, wherein the first and second zones have substantially equal areas.

7. The method according to claim 2 for watermarking a video signal, wherein a sub-block centered inside the block is defined in each block of the reference grid, the first zone being defined by the interior of the sub-block and the second zone being the zone in the block complementary to the first zone.

8. The method according to claim 7 for watermarking a video signal, wherein the blocks and sub-blocks of the reference grid are rectangular.

9. The method according to claim 1 for watermarking a video signal, wherein the modification of the coordinates of the selected motion vector, if any, is a weighted symmetry applied to the point (V).

10. The method according to claim 8 for watermarking a video signal, wherein the modification of the coordinates of the selected motion vector, if any, is either a weighted central symmetry relative to one of the vertices of the sub-block or a weighted axial symmetry relative to one of the sides of the sub-block applied to the point (V).

11. The method according to claim 1 for watermarking a video signal, wherein each bit of the binary marking key is associated with a plurality of selected motion vectors.

12. The method according to claim 1 for watermarking a video signal, wherein some of the bits of the binary marking key are associated with motion vectors calculated by motion estimation between two images of the video signal, and wherein at least one other portion of the bits of the binary marking key is associated with motion vectors calculated by motion estimation between at least two other images of the video signal.

13. A device for watermarking a video signal, the device including means for implementing the method according to claim 1.

14. A computer readable data medium, including means for storing a video signal watermarked with the aid of the method according to claim 1.

15. A method of extracting watermarking from a video signal watermarked by applying the method according to claim 1, which extraction method comprises applying a function for extracting the binary marking key comprising:

selecting the watermarked vectors;

marking a point corresponding to the coordinates of each watermarked motion vector, the marking taking place in the reference space; and assigning the binary value of the zone in which the point is situated to the bit of the marking key with which the selected motion vector is associated.

16. The method according to claim 15 for extracting the watermarking from the video signal, the video signal further watermarked by the following steps:

calculating a hierarchical plurality of successive levels of motion vectors, the motion vectors of a given level each being associated with a plurality of motion vectors of the next lower level;

selecting at least some of the motion vectors belonging to the highest level;

applying the watermarking function to each selected motion vector, leading to calculating a modification parameter for said motion vector; and applying the modification parameter of the selected motion vector to the motion vectors of a lower level associated with said motion vector;

wherein, for each motion vector of the highest level selected on application of the watermarking method, the following steps are applied:

extracting the watermarked motion vectors associated with said motion vector;

calculating an average vector equal to the average of the watermarked motion vectors associated with said motion vector; and applying the marking key extraction function to the calculated average vector.

17. A device for extracting the watermarking from a video signal, the device including means for implementing the method according to claim 15.

18. The method according to claim 9, for watermarking a video signal, wherein the modification of the coordinates of the selected motion vector, if any, is either a weighted central symmetry relative to one of the vertices of the sub-block or a weighted axial symmetry relative to one of the sides of the sub-block applied to the point (V).

* * * * *